(12) United States Patent
Belady et al.

(10) Patent No.: US 9,252,598 B2
(45) Date of Patent: Feb. 2, 2016

(54) DATA PLANT—A RAW MATERIAL POWERED DATA GENERATOR

(75) Inventors: Christian L. Belady, Mercer Island, WA (US); Sean M. James, Olympia, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 960 days.

(21) Appl. No.: 13/357,877

(22) Filed: Jan. 25, 2012

(65) Prior Publication Data

US 2013/0190936 A1 Jul. 25, 2013

(51) Int. Cl.
*G05D 3/12* (2006.01)
*H02J 3/38* (2006.01)
*H02J 3/00* (2006.01)

(52) U.S. Cl.
CPC ............ *H02J 3/382* (2013.01); *H02J 2003/001* (2013.01); *H02J 2003/007* (2013.01); *Y02E 60/76* (2013.01); *Y04S 40/22* (2013.01)

(58) Field of Classification Search
CPC ........ H02J 1/00; H02J 3/382; H05K 7/20763; H05K 7/1497; H05K 7/1492; Y02B 10/12
USPC ......................................................... 700/286
See application file for complete search history.

(56) References Cited

U.S. PATENT DOCUMENTS

| 7,113,127 | B1 * | 9/2006 | Banet et al. .............. 342/357.31 |
| 7,961,463 | B2 | 6/2011 | Belady et al. |
| 8,032,767 | B2 | 10/2011 | Belady et al. |
| 2004/0219415 | A1 * | 11/2004 | Brignone et al. ................ 429/34 |
| 2007/0282165 | A1 * | 12/2007 | Hopkins ............ A61B 1/00029 600/109 |
| 2009/0072624 | A1 | 3/2009 | Towada |
| 2010/0024445 | A1 | 2/2010 | Cichanowicz |
| 2011/0278928 | A1 * | 11/2011 | Burger et al. .................... 307/39 |
| 2011/0316337 | A1 * | 12/2011 | Pelio et al. ....................... 307/24 |

(Continued)

OTHER PUBLICATIONS

Barrett, Alex, "Fuel Cell Technology Pitched as Data Center Power Source", Retrieved at <<http://searchdatacenter.techtarget.com/news/2240111750/Fuel-cell-technology-pitched-as-data-center-power-source>>, Nov. 30, 2011, pp. 1-14.

(Continued)

*Primary Examiner* — Robert Fennema
*Assistant Examiner* — Sivalingam Sivanesan
(74) *Attorney, Agent, or Firm* — Henry Gabryjelski; Kate Drakos; Micky Minhas

(57) ABSTRACT

A "data plant" accepts power-generation-capable raw materials and outputs processed data. The processed data can be delivered to consumers more efficiently than other forms of power transfer, including power transfer through electricity, steam, physical motion, and the like. Consequently, data plants can be located where power-generation-capable raw materials can be obtained inexpensively, for free, or where power-generation-capable raw materials are waste products for which the operator of the data plants can be compensated for processing. Self-powered data plants need not even be continuously fed with power-generation-capable raw materials and, if such data plants receive and output data via wireless communications, the self-powered data plants can require no physical connection or attachment at all. For example, a single piece of silicon comprising a silicon solar cell that generates electrical power and silicon circuitry that consumes it to perform data processing can be a silicon self-powered data plant.

20 Claims, 5 Drawing Sheets

(56) References Cited

U.S. PATENT DOCUMENTS

| | | | |
|---|---|---|---|
| 2012/0056002 A1* | 3/2012 | Ritamaki | G06K 19/07786 235/492 |
| 2012/0109705 A1* | 5/2012 | Belady et al. | 705/7.22 |
| 2013/0163193 A1* | 6/2013 | Ballantine et al. | 361/679.47 |

OTHER PUBLICATIONS

Miller, Rich, "Using Microturbines to Power a Data Center", Retrieved at <<http://www.datacenterknowledge.com/archives/2011/08/15/using-microturbines-to-power-a-data-center/>>, Aug. 15, 2011, p. 1.

"Methane-Powered Data Center under Construction in UK", Retrieved at <<http://www.internetblog.org.uk/post/1345/methane-powered-data-center-under-construction-in-uk/>>, May 21, 2010, pp. 3.

Miller, Rich, "Absorption Chillers: Heat into Cooling", Retrieved at <<http://www.datacenterknowledge.com/inside-ibms-greenest-data-center/absorption-chillers-heat-into-cooling/>>, Dec. 8, 2009, p. 1.

Takahashi, Dean, "Wind Could Supply Electrical Power to Portable Data Centers off the Grid", Retrieved at <<http://venturebeat.com/2011/07/31/wind-could-supply-electrical-power-to-data-centers-in-a-box/>>, Jul. 31, 2011, pp. 6.

Nichols, Crystal., "New Data Center Power Sources", Retrieved at <<http://www.unitiv.com/it-solutions-blog/bid/69415/New-Data-Center-Power-Sources>>, Jul. 25, 2011, p. 1.

Farina, Michael F., "Flare Gas Reduction", Retrieved at <<http://www.genewscenter.com/ImageLibrary/DownloadMedia.ashx?MediaDetailsID=3691>>,Oct. 2010, pp. 60.

"Microsoft's Quest for Greater Efficiency in the Cloud", Retrieved at <<http://www.microsoft.com/presspass/features/2011/apr11/04-19GreenDatacenters.mspx>>,Apr. 19, 2011, pp. 3.

Belady, Christian, "The Disappearing Datacenter", Retrieved at <<http://blogs.technet.com/b/msdatacenters/archive/2011/04/19/the-disappearing-datacenter.aspx>>, Jul. 20, 2011, pp. 2.

"Microsoft: The Cloud is the Utility of the Future", Retrieved at <<http://www.datacenterknowledge.com/archives/2011/05/26/microsoft-the-cloud-is-the-utility-of-the-future/>>,Retrieved Date : Jan. 13, 2012, pp. 3.

"Data Center Industrialization Gains Steam", Retrieved at <<http://www.datacenterknowledge.com/2011-year-ahead-part-2/>>, Retrieved Date : Jan. 13, 2012, pp. 2.

\* cited by examiner

DATA PLANT—A RAW MATERIAL POWERED DATA GENERATOR

BACKGROUND

The modern electrical grid, through which modern society receives and accesses electrical power, has become so ubiquitous that its context often becomes lost. And that context is, simply, that the modern electrical grid is nothing more than a mechanism by which to transfer power from places where power can be generated to places where power can be conveniently consumed and utilized. But the mere ubiquity of the modern electrical grid does not necessarily mean that it is the most efficient mechanism for transferring power.

Three hundred years ago, early settlers in the Western region of modern-day New York State sought to harness at least some of the power of Niagara Falls. Early attempts to do so were based on the mechanical transmission of power. For example, in the late 1750's, some of the power of Niagara Falls was harnessed to turn waterwheels, which were connected to a sequence of belts, which turned equipment in a local sawmill. Thus, the sequence of belts transferred power, in the form of rotational motion, from the location at which such power was generated, namely by the water turning a waterwheel, to another location where such power could be utilized, namely the sawmill. Needless to say, the transfer of power through a sequence of belts, in the form of rotational motion, comprises inherent limitations in how far such power can be transferred.

To improve upon this power delivery, electrical generators were installed at Niagara Falls in the early 1880's. These electrical generators transferred power in the form of direct current electricity. As will be recognized by those skilled in the art, direct current electricity, much like the sequence of belts, was not able to transfer power for long distances. What was ultimately selected to transfer power from Niagara Falls, where the movement of the water inherently comprises power generation capability, to places where that power could be conveniently utilized, such as the nearby town of Buffalo, N.Y., was alternating current electricity. As is well known to electrical power history buffs, in the mid-1890's, Westinghouse, using Nikola Tesla's invention, installed alternating current electrical generators at Niagara Falls and transmitted power using alternating current electricity. The modern electrical power grid is based on this very same three-phase alternating current that was utilized to deliver power from Niagara Falls to, for example, Buffalo N.Y. Thus, contextually, the modern electrical power grid is nothing more than the most efficient method of delivering power across distances in the 1880's.

As electrical power delivery became ubiquitous, a greater quantity of devices were made available that could convert such electrical power into useful results. For example, an electrical heater can be plugged into the electric power grid and can utilize electrical power received from the grid to generate a useful result, namely heat on a cold day. Were heat the only useful byproduct that could be generated, more efficient power delivery mechanisms could be utilized. For example, many cities and universities in cold climates have a centralized steam power plant that utilizes power-producing raw materials, such as coal or natural gas, and then delivers the power derived from those raw materials in the form of heat, transported via steam in steam pipes running through steam tunnels. Consequently, in such cities and universities, rather than plugging in a heater into the electrical power grid, residents can simply increase the amount of steam flowing through a steam radiator. In both instances, power was transmitted from a power generation facility to a consumer of power that utilized that power to warm their living space. In the first example, the power was generated at an electrical power plant and then transmitted in the form of electrical power, through the electrical power grid, to a user that utilized a device, namely an electrical heater, to generate a useful result, namely heat. In the second example, the power was generated at a steam power plant and then transmitted in the form of heat power, or steam power, through the network of steam pipes in steam tunnels, to a user that utilized the device, namely a steam powered heater, to generate a useful result, namely heat.

Of course, the modern electrical power grid can provide power for many other types of electrical devices, beyond simply electrical heaters, that can generate other types of useful results. For example, electrically powered entertainment devices provide audio/visual entertainment, electrically powered lamps provide light, electrically powered shavers provide hair trimming, and so on. In each case, the power obtained from power-generation-capable raw materials was transmitted, via the electrical power grid, and utilized to generate a useful result.

Increasingly, one useful result generated by electrically-powered devices is the processing of digital data by electrically-powered computing devices. Personal computing devices are electrically powered because, at the time that personal computing devices were initially developed, and still to this day, alternating current electricity represents the most ubiquitous form of power distribution. The circuitry inside a personal computing device, and, indeed, in enterprise computing devices as well, such as server computing devices, natively operates on direct current electricity. As will be recognized by those skilled in the art, power supplies convert alternating current electricity that is provided by the electrical power grid into the direct current electricity that can be consumed by the circuitry inside of a computing device that actually performs the digital data processing.

Because digital data communications over short distances were substantially faster than those over long distances, the processing of digital data was typically performed at the location where the digital data was created, and ultimately consumed by the user of a computing device. Thus, for example, traditionally, the processing of digital data performed by individual users utilizing personal computing devices was performed by those personal computing devices themselves, which were co-located with the user. Similarly, as another example, traditionally, the processing of digital data performed by enterprise users utilizing enterprise computing devices, such as server computing devices, was performed by those server computing devices themselves which were located in one or more of the facilities that also housed the enterprise.

As computer network communications have increased in efficiency and bandwidth, it has become more practical to perform digital data processing at a location remote from the location where such data is initially generated, and where the processed data will be consumed. For example, a user can upload a digital photograph to a server and then cause the server to process the digital photograph, changing its colors and applying other visual edits to it. In such an example, of the digital processing that is being performed is being performed by a device that is remote from the user. Indeed, in such an example, if the user was utilizing a battery-operated computing device to interact with the server such as, for example, a laptop or smartphone, the user could be in a location that was not receiving any electrical power at all. Instead, electrical power can have been delivered to the server, which is remote from the user, and the server can have utilized electrical power to process the data provided by the user and then return the processed data to the user. In such an example, the user was able to perform processing on digital data without receiving any electrical power and instead, receiving, only the result of the work performed by electrical power, namely the processed data that was performed by the server computing device that has consumed electrical power that was delivered to the location where the server was located.

As will be recognized by those skilled in the art, such remote data processing is increasingly performed by collections of computing devices that are commonly referred to as a "data center". Efficient network communications enable individual users, and enterprises, to transmit data to such data centers, where the data can be stored, processed, and otherwise operated upon by the computing devices in the data center. Individual users and enterprises can then retrieve processed data from the data centers when needed. As will also be recognized by those skilled in the art, modern data centers consume a large amount of electrical power such that the cost of the electrical power consumed by the data center becomes a major, if not the primary, component in determining a data center's fiscal viability.

SUMMARY

In one embodiment, data processing circuitry can be co-located with a raw-material-to-DC electrical power converter, thereby creating a "data plant" that can accept raw materials and output processed data, which can be delivered more efficiently and less expensively than other forms of power transmission, such as electrical power transmission, steam power transmission, mechanical power transmission and the like. Since power is required to process data, data that has already been processed can be thought of as data that has a higher "power content" than data that has not yet been processed, since the latter will require additional power to process before consumption that the former, having already been processed, will not require. Transmission of the data processed by the data plant represents, therefore, a form of power transfer.

In another embodiment, the data processing circuitry no longer requires conversion in order to receive natively-acceptable power, such as direct current electrical power. Consequently, the power supplies that are currently present in all modern computing devices would not be necessary. Similarly, the power converter co-located with such data processing circuitry could generate power that can be natively accepted by a data processing circuitry, such as direct current electrical power.

In a further embodiment, data plants which can convert waste products into processed data can be offered to entities as a service to "treat" the waste products produced by those entities. Oil and natural gas companies generate waste gases while drilling for, and extracting, oil and liquefied natural gas. A data plant powered off of those waste gases can enable those companies to achieve environmental targets, while simultaneously producing useful data processing. Similarly, municipalities and waste collection and treatment companies own waste landfills that, likewise, generate gas. A data plant powered off of those gases can enable municipalities and waste collection and treatment companies to, likewise, achieve environmental targets while simultaneously producing useful data processing. The processed data generated by such a waste-product-fueled data plant can be delivered to consumers of data substantially more efficiently then could any other power transmission medium, such as electricity, steam, rotational movement, and the like.

In a still further embodiment, a data plant can be self-powered. A silicon data plant can be comprised of a single piece of silicon that can comprise a silicon solar cell and, on the same piece of silicon, data processing circuitry that is powered by the silicon solar cell. Such a silicon data plant need only be exposed to sunlight in order to be able to perform data processing and generate processed data. A betavoltaic data plant can comprise a betavoltaic battery that can generate direct-current electrical power from the relatively harmless emissions of beta particles from radioisotopes, and that direct-current electrical power can be consumed by the data processing circuitry. If the data were to be transmitted to or from such self-powered data plants via wireless communications, such self-powered data plants would require no physical connections at all.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

The following description relates to data plants, which accept power-generation-capable raw materials and output processed data. The processed data can be delivered to consumers of that data more efficiently than other forms of power transfer, including, for example, power transfer through electricity, steam, physical motion, and the like. Consequently, data plants can be located where power-generation-capable raw materials can be obtained inexpensively, for free, or where power-generation-capable raw materials are waste products for which the operator of the data plants can be compensated for processing. Often, such locations are in remote regions where existing power transmission mechanisms render it fiscally irresponsible to attempt to derive power from such power-generation-capable raw materials and transmit that power to areas where it can be consumed. Data transmission, however, is orders of magnitude less expensive than existing forms of power transmission and, consequently, data plants can be located in areas of inexpensive, or free, power-generation-capable raw materials and can then deliver processed data to consumers in a financially viable manner. If the power-generation-capable raw materials are waste products, then the operator of the data plant can offer a service to treat such waste products by using them to generate processed data, thereby reaping a financial benefit from both the sale of the treatment of waste products and the sale of the processing of data. Self-powered data plants need not even be continuously fed with power-generation-capable raw materials and, if such data plants receive and output data via wireless communications, then such self-powered data plants can require no physical connection or attachment at all. Examples of self-powered data plants include a silicon self-powered data plant that is comprised of a single piece of silicon that comprises a silicon solar cell that can generate electrical power and silicon circuitry that can consume that power to perform data processing.

For purposes of illustration, the techniques described herein make reference to existing and known data processing circuitry such as the silicon-based circuitry commonly found in modern computing devices, including desktop, laptop and server computing devices, as well as network communication computing devices, such as routers and switches, and data storage computing devices such as magnetic and solid-state hard disk drives. Such references, however, are strictly exemplary and are not intended to limit the mechanisms described to the specific examples provided. Indeed, the techniques described are applicable to any mechanisms and equipment that can process data, irrespective of the manner in which such mechanisms and equipment operate and irrespective of the type of power required by such mechanisms and such equipment performing such data processing.

Figure 1:
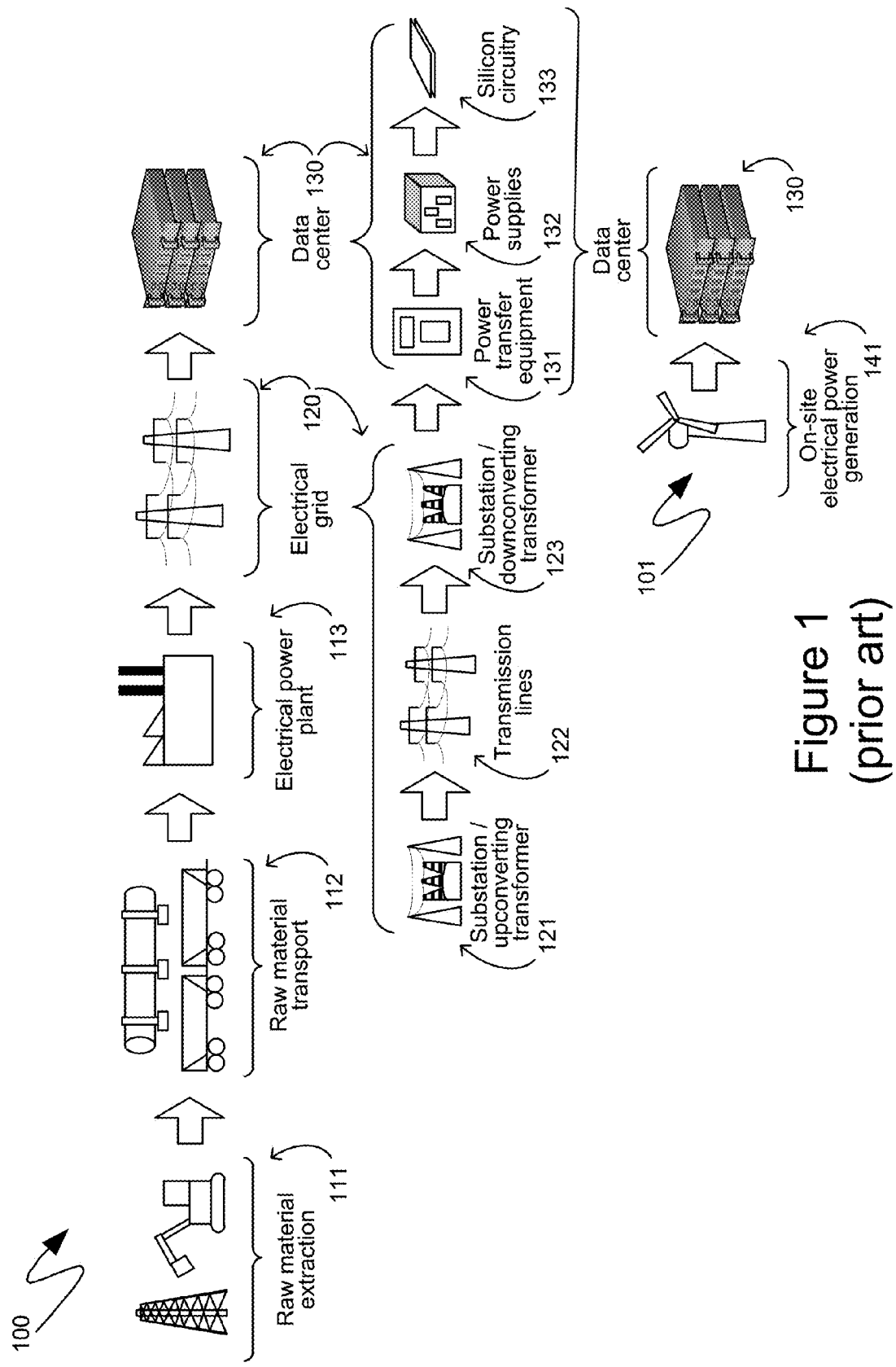
FIG. 1 is a block diagram of exemplary existing data processing supply chains.

Turning to FIG. 1, the systems 100 and 101 illustrated therein show current supply chains for the generation of processed data. More specifically, the system 100 illustrates the current, conventional mechanism for generating processed data from raw materials that are capable of producing power. Initially, as shown in the system 100, raw materials that are capable of producing power are extracted as part of a raw material extraction 111. Such raw material extraction 111 includes the mining of power-generation-capable raw materials such as coal and uranium, the drilling and subsequent removal of power-generation-capable raw materials such as oil and natural gas, and other like raw material extraction. Subsequently, the raw materials extracted by the raw material extraction 111 need to be transported to a power plant, such as the electrical power plant 113. Such raw material transport 112 can include oil pipelines for the transmission of oil, liquefied natural gas trucks and boats for the transportation of natural gas, coal cars on a train for the transportation of coal, and other like raw material transportation mechanisms.

At the electrical power plant 113, the raw materials are utilized to generate electrical power. For example, coal or natural gas can be burned to heat water, which can generate steam, which, in turn, drives steam-powered electrical current generators which can, ultimately, generate electrical current from those raw materials. Such generated electrical power is then provided to an electrical grid 120 to which a data center 130 can be connected. The data center 130 can receive electrical power from the electrical grid 120, namely the electrical power generated by the electrical power plant 113, and can utilize such electrical power to perform data processing.

The electrical grid 120, as will be recognized by those skilled in the art, comprises a complex system of transmission lines 122 as well as various voltage converters and substations, such as the substation 121 that can convert produced electrical power to a higher voltage for transmission across the transmission lines 122 with a minimum of transmission loss, and the substation 123 which can convert transmitted electrical power to a lower voltage for subsequent utilization by, for example, the data center 130.

The data center 130, as will also be recognized by those skilled in the art, also comprises a complex system of power equipment. For example, the data center 130 can comprise power transfer equipment 131 that can accept electrical power from the electrical power grid 120 and can convert and filter it into a form appropriate for the servers and other computing devices of the data center 130. In addition, the power transfer equipment 131 can comprise backup power equipment that can provide power to the data center 130 when electrical power from the electrical grid 120 is unavailable. As will be recognized by those skilled in the art, electrical power from the electrical grid 120 can have a high incidence of unavailability, given the uptime requirements of typical data centers, such as the data center 130. Consequently, the power transfer equipment 131 typically comprises at least one form of backup power equipment such as, for example, a gas powered electric generator.

In addition to the power transfer equipment 131, the computing devices in the data center 130 typically comprise their own power supplies 132 in order to convert electrical power from the alternating current electrical power provided via the electrical grid 120 into direct current electrical power which the circuitry 133 of those computing devices natively consumes in order to perform data processing. As utilized herein, the term "data processing circuitry" means the circuitry through which computer-readable digital data passes as it is received, processed and transmitted back by computing devices providing remote processing of data. Consequently, the term "data processing circuitry" includes not only the central processing units of server computing devices, but also the other processing units of those server computing devices, as well as the processing units of network computing devices, such as routers and switches, and data storage computing devices such as magnetic and solid-state hard disk drives. While the system 100 of FIG. 1 nominates the circuitry 133 as "silicon" circuitry, the descriptions provided herein are agnostic as to the material from which the data processing circuitry is manufactured. Thus, while most data processing circuitry is, currently, silicon-based, the descriptions provided herein are equally applicable to data processing circuitry manufactured from any other materials including, for example, optical data processing circuitry and magnetic data processing circuitry.

As can be seen from the system 100 of FIG. 1, the conversion of power-generation-capable raw materials into processed data can comprise a myriad of intermediate mechanisms and processes, which can introduce inefficiencies, unreliability, and increased cost. Current attempts to bypass some of those intermediate mechanisms and processes only remove some of their attendant inefficiencies. For example, co-pending U.S. Patent Application Publication No. 2001/0278928, filed on May 17, 2010 and assigned to the assignee of the present application, is directed to a "Wind-Powered Data Center". Such a wind powered data center is illustrated by the system 101 of FIG. 1, whereby the on-site electrical power generation 141, such as in the form of wind turbines, provides electrical power directly to the data center 130, thereby bypassing the raw material extraction 111, the raw material transport 112, the electrical power plant 113, and the electrical power grid 120. But, the power transfer equipment 131 of the data center 130 and the power supplies 132 of the computing devices in the data center 130 are not bypassed. In other words, by using off-the-shelf components, such as wind turbines and computing devices, a data center with on-site electrical power generation necessarily generates such electrical power in the form of three-phase alternating current upon which the electrical grid 120 is based and which the computing devices are designed to accept. This is true despite the fact that the electrical grid 120 is not actually part of the system 101. Its effects, are, nevertheless, felt by virtue of the conversion of wind power into alternating current electrical power and in the processing of data performed by first converting that alternating current electrical power into direct current electrical power, such as would be performed by the power supplies 132.

Figure 2:
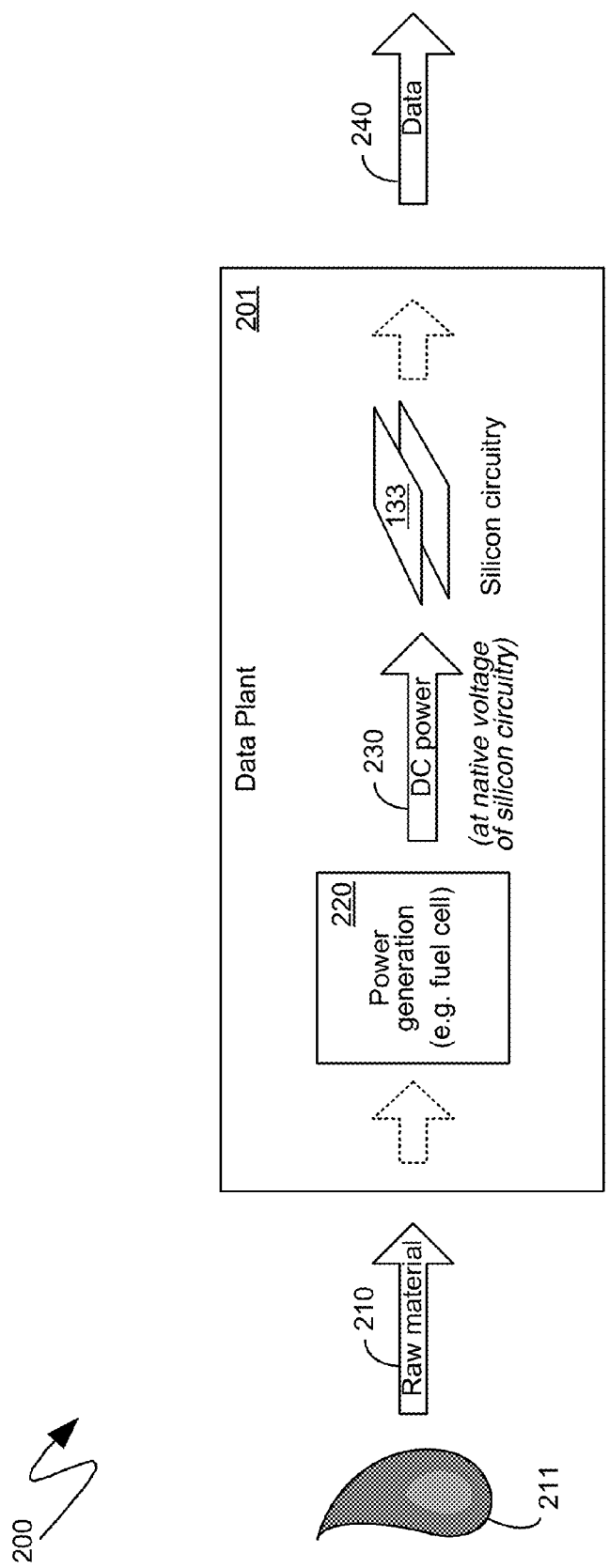
FIG. 2 is a block diagram of an exemplary data plant.

If the electrical grid 120 is to be bypassed, then no vestiges of it, such as the use of alternating current electrical power, should remain if those vestiges introduce inefficiencies. Turning to FIG. 2, the system 200 shown therein illustrates a data plant 201 that can accept power-generation-capable raw material 210 and can output processed data 240. The power-generation-capable raw material 210 can be provided to a power generation component 220 of the data plant 201, which can convert the power-generation-capable raw material 210 into direct current power 230, optimally at the native voltage of the data processing circuitry 133. This direct current electrical power 230 can be provided to the data processing circuitry 133, which can also be part of the data plant 201. As a result, the data processing circuitry 133 can process data in a traditional manner, and can output processed data 240.

In one embodiment, the power generation component 220 can be a fuel cell that can generate direct current electrical power from natural gas 211, hydrogen, or other fuel, though, for the sake of simplicity of illustration, FIG. 2 only includes an illustrative indication of the natural gas fuel 211. More specifically, and as will be understood by those skilled in the art, the power generation component 220 can be a gas solid oxide fuel cell that can comprise an electrolyte, typically in the form of a solid ceramic material, and an anode and cathode on opposite sides of the electrolyte, each typically comprised of an ink coating on the electrolyte. Such a fuel cell can accept natural gas 211 as input and, inside of the fuel cell, the natural gas can be mixed with water steam to form a "reformed fuel". This reformed fuel enters the anode side of the electrolyte and as it crosses the anode it attracts oxygen ions from the cathode, which are attracted into the cathode from the hot air that is fed to the fuel cell. The oxygen ions combine with the reformed fuel in the electrolyte to produce electricity, water, and small amounts of carbon dioxide, as well as heat. The heat and water can then be utilized to continue the process, thereby enabling the fuel cell to continue to produce direct-current electricity so long as natural gas remains available to it.

Typically, a fuel cell can achieve efficiency ratings of approximately 60% as opposed to, for example, efficiency ratings of 30%-40% for conventional turbines that generate alternating electrical current. More colloquially, a fuel cell can be almost twice as efficient as conventional electricity generating turbines. Additionally, and as evidenced by the detailed description provided above, a fuel cell typically lacks moving parts, except for fans. Such lack of moving parts can make fuel cells more reliable and less prone to mechanical failures.

Fuel cells can also be designed to output electrical power in the form of direct current electricity at 380 VDC. As will be recognized by those skilled in the art, 380 VDC is typically the native voltage of the data processing circuitry utilized by the server computing devices typically found in data centers. Thus, rather than utilizing existing server computing devices, which, as indicated previously, comprise power supplies to transform alternating current electrical power into, typically, 380 volt direct current electrical power, the data plant 201 can eliminate such power supplies and can comprise only the data processing circuitry itself.

Some data processing circuitry such as, for example, network switch and router circuitry, may only accept lower voltages such as, for example, 48 VDC. In such instances, mechanisms can be provided to lower the voltage of the DC power 230 to that which can be accepted by such switch and router data processing circuitry.

While the above description was provided within the context of the fuel cell, the power generation components 220 of the data center 201 are not limited to fuel cell technologies and can implement any technology for generating direct current electrical power from power-generation-capable raw material 210 including, for example, gas turbines, steam turbines, reciprocating engines, and other like direct current electrical power generating components.

In addition to providing natively-acceptable power to the data processing circuitry 133, the power generation component 220 can also, in one embodiment, provide power to auxiliary components that may be part of the data plant 201, such as a cooling component. Because such a cooling component can be optional, it is not shown in the system 200 of FIG. 2. Alternatively, or in addition, the heat that is generated by, for example, the fuel cell acting as the power generation component 220, can be utilized to supplement, and thereby increase, airflow across the data processing circuitry 133. In such an alternative embodiment, any powered cooling components can be supplemented with, or replaced by, a heat-driven airflow generation component to further cool the data plant 201.

In one embodiment, the processed data 240 that can be generated by the data plant 201 can be provided to consumers of such data via existing computer networking technologies that can support long-range data communication. For example, the processed data 240 can be transmitted from the data plant 201 to consumers of such data via fiber-optic cabling or other like long-range data communication technologies. As will be recognized by those skilled in the art, fiber-optic cabling can be orders of magnitude less expensive, on a per-distance basis, than other power transmission mechanisms such as, for example, electrical power transmission lines. Additionally, advances in data communication technology enable ever-increasing amounts of data to be communicated along the same fiber-optic cable, or other like data transmission medium, in contrast to other power transmission mechanisms whose power transmission capacity is, typically, essentially invariant. Stated differently, the disparity between how much data can be delivered via the fiber optic cable as compared to how much electrical power can be delivered via an electrical transmission line will only increase over time, thereby providing increasing efficiency benefits to the data plant 201.

The exemplary data plant 201, shown in the system 200 of FIG. 2, can, in one embodiment, eschew any form of backup power, such as backup generators or a backup connection to the electrical grid. Such an embodiment can be practical because the power generation component 220, such as a fuel cell, can operate utilizing power-generation-capable raw materials 210, such as natural gas 211, that can be provided orders of magnitude more reliably than electrical power can currently be provided by the electrical power grid. The inherent unreliability of the modern electrical power grid necessitates the need for backup power generation capabilities at modern data centers. By generating DC power 230 from power-generation-capable raw material 210 directly, the data plant 201 avoids the inherent unreliability of the modern electrical power grid and, as such, requires no further power generation backup.

To the extent that the power-generation-capable raw material 210 is provided unreliably to the data plant 201, such unreliability can, in one embodiment, only result in the unreliability of the provision of processed data 240. Two or more data plants, such as the data plant 201, can provide for distributed processing of data such that, if one data plant experiences an interruption in the provision of power-generation-capable raw material 210 and, consequently, experiences an interruption in the processing of data, the other one or more data plants can compensate for such an interruption in the processing of data and the provision of processed data 240 from the aggregate set of the two or more data plants can remain uninterrupted. For example, two or more data plants can be located proximately to one another, such as in a common geographic area from which power-generation-capable raw materials can be obtained for multiple data plants. Since such multiple data plants can be located proximately to one another, wired or wireless communications between them can be established by which data can be passed among the multiple data plants in a very efficient manner, and which can be independent of, and of higher bandwidth than, the communications through which the processed data is delivered to data consumers. As one data plant, therefore, experiences an interruption in the processing of data, other ones of the multiple data plants located proximately thereto can quickly compensate for such interruption. Alternatively, geographically remote data plants can provide the above-described redundancy, and the communications between the data plants to enable such redundancy can occur via the same mechanisms and data communication infrastructure by which processed data is delivered to data consumers. Stated differently, rather than providing for backup power generation, data plant redundancy can be provided by computer-executable instructions managing the processing of data across two or more data plants, whether located proximately or remotely. As will be recognized by those skilled in the art, redundancy provided by computer-executable instructions can be orders of magnitude less expensive than redundancy provided by backup power generation hardware.

Thus, as can be seen, the data plant 201 comprises a power generation component 220 that directly converts raw materials 210 into direct current electrical power 230 at a native voltage of the data processing circuitry 133. As such, the data plant 201 is different from a conventional data center, such as that illustrated by the system 100 of FIG. 1, where the conversion of raw materials 210 into direct current electrical power 230 is not performed directly by one or more components that are all co-located with the processing circuitry 133, but rather is indirectly performed by a series of distributed and remotely located components, including, for example, the power plant 113, various upconverting and downconverting transformers, such as the transformers 121 and 123, and the power supplies 132 of the server computing devices in the data center 130, all of which were shown in FIG. 1. Additionally, as can also be seen, the data processing circuitry 133 of the data plant 201 directly receives the direct current electrical power 230 from the power generation component 220, thereby avoiding the inefficiencies of the power supplies 132, show in FIG. 1, that are present in all modern direct-current-powered electrical devices that derive electrical power from the electrical grid, such as modern computing devices.

Figure 3:
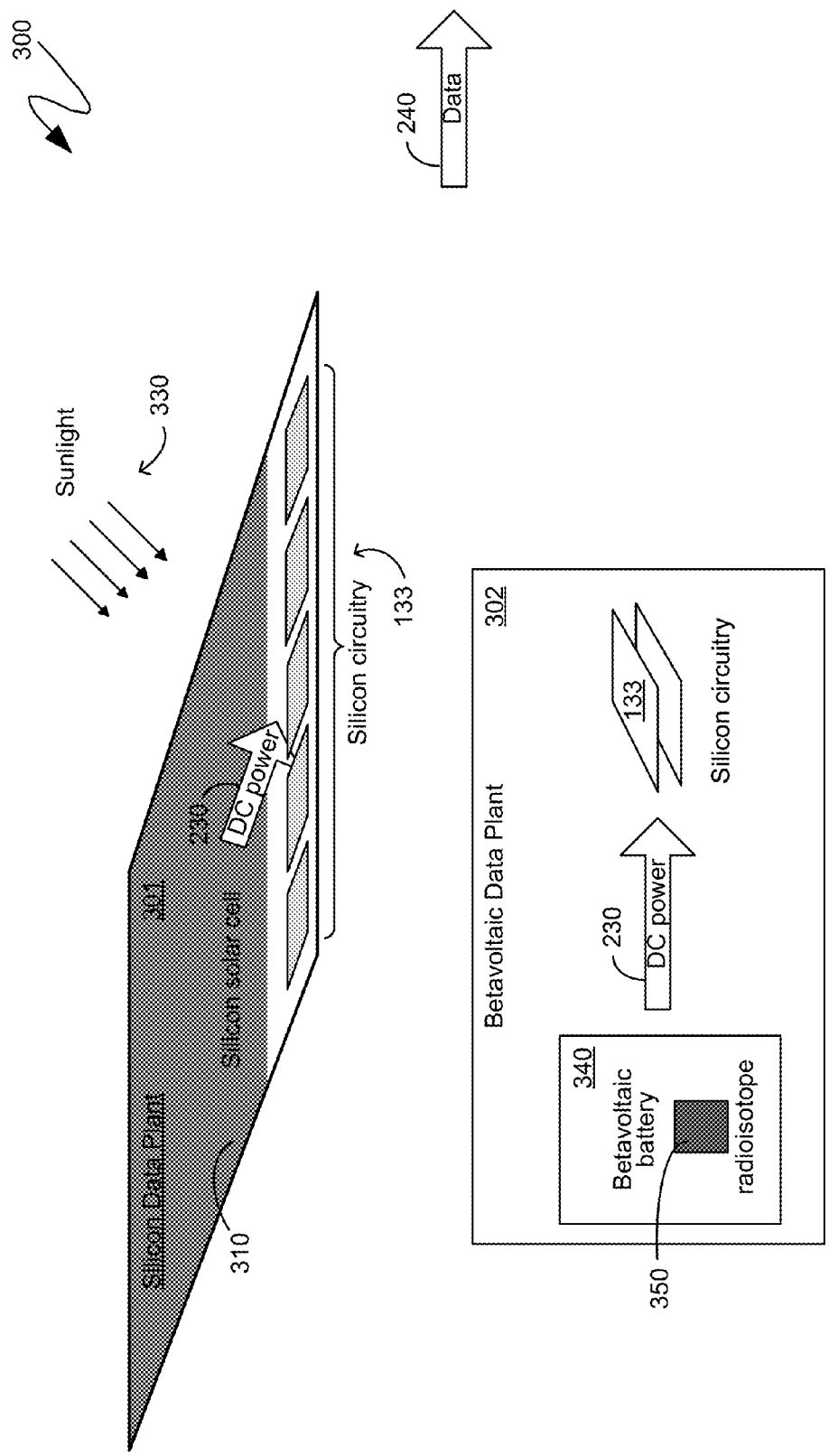
FIG. 3 is a block diagram of exemplary self-powered data plants.

In one embodiment, a data plant, such as the data plant 201, can be self-powered such that it can output processed data 240 without continuous input of power-generation-capable raw material 210. Turning to FIG. 3, the system 300 shown therein illustrates two examples of self-powered data plants in the form of the silicon data plant 301 and the betavoltaic data plant 302. In one embodiment, the silicon data plant 301 can be comprised of a single silicon wafer that can comprise a silicon solar cell 310 and data processing circuitry 133 in the form of silicon-based processors etched onto the silicon wafer of the silicon data plant 301. The data processing circuitry 133 can receive direct current electrical power 230 from the silicon solar cell 310 directly, such as, for example, via the electrical pathways etched onto the silicon wafer that comprises both the silicon solar cell 310 and the data processing circuitry 133. Such a silicon data plant 301 can, so long as sunlight 330 is incident upon the silicon solar cell 310, continue to produce processed data 240 without any provision of power-generation-capable raw material 210.

Another example of a self-powered data plant can be the betavoltaic data plant 302 that can comprise a betavoltaic battery 340 that can generate direct current electrical power 230 from the radioisotope 350 that can be part of the betavoltaic battery 340. One radioisotope that can be utilized as the radioisotope 350 is tritium, which is commonly found on the hands of wristwatch dials to cause those hands to be visible in the dark. Tritium-powered betavoltaics are commonly utilized to power emergency "exit" signs and other like devices. The direct current electrical power 230 generated by the betavoltaic battery 340 can, as before, provide power to the data processing circuitry 133, thereby enabling the betavoltaic data plant 302 to generate processed data 240 without power-generation-capable raw materials being continuously provided to it.

While the provision of processed data 240 has been described within the context of fiber optic cabling, or other wired data communication mechanisms, it can equally be provided through wireless communication means, such as those currently utilized by computing devices to wirelessly communicate with one another. In an embodiment where a data plant provides processed data wirelessly, self-powered data plants, such as the silicon data plant 301 and the betavoltaic data plant 302, can be completely stand-alone, requiring no physical connection to any other component or element. Such standalone capability can enable flexible installations of such self-powered, wireless data plants. For example, individual roofing tiles could be replaced with silicon data plant roofing tiles, where each roofing tile comprises a silicon data plant. The silicon data plants can convert sunlight that is incident upon them, such as the sunlight 330, into processed data 240 that can be wirelessly communicated to wireless receivers installed in a convenient location that is proximate to the roofing tiles silicon data plants. In such a manner each roofing retrofit could bring online a small data center's worth of data processing capability without any additional burden being placed on existing power delivery infrastructure, such as the electrical power grid.

Figure 4:
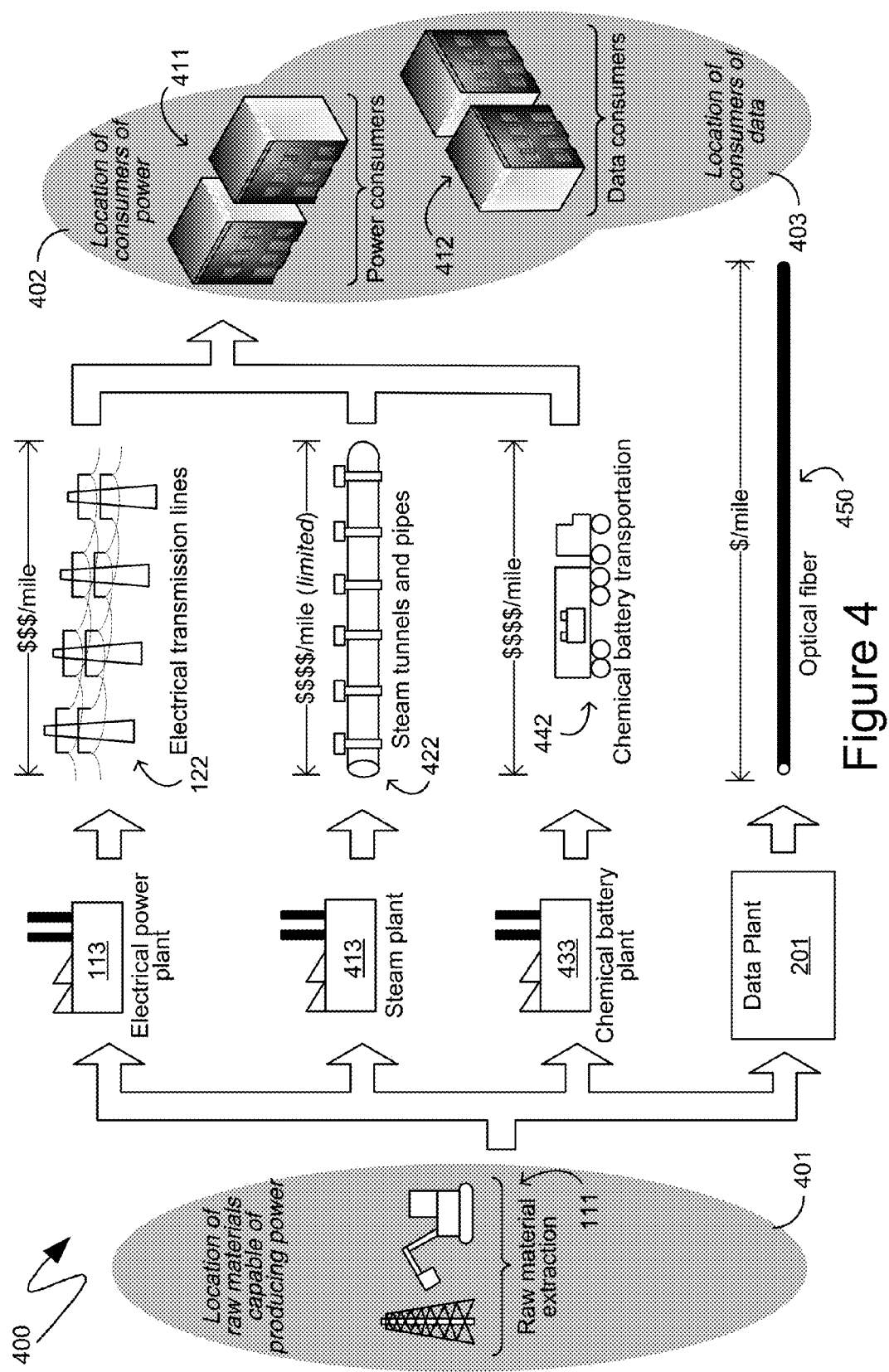
FIG. 4 is a block diagram of various exemplary power transfer mechanisms.

In many instances power-generation-capable raw materials are located in remote locations that are a substantial distance away from metropolitan areas where the consumers of power are located. Turning to FIG. 4, the system 400 shown therein illustrates the advantages of a data plant, such as the data plant 201, in utilizing the power-generation-capable raw materials to deliver useful results to consumers. In the exemplary system 400 of FIG. 4, the location of raw materials capable of producing power 401 can be remote from the location 402 of the consumers of power 411. Traditionally, in such an instance, the power-generation-capable raw materials are often left unused, as it is not financially viable to extract power from the power-generation-capable raw materials at the location 401 and then deliver it all the way to the power consumers 411 at the location 402. The system 400 of FIG. 4 illustrates the financial and practicality considerations in attempting to deliver power from the power-generation-capable raw materials, from which such power can be extracted, to the power consumers 411. One mechanism for transporting power from the raw materials in the location 401 to the power consumers 411 in the location 402 would be to "package" the power as electricity. Thus, an electrical power plant 113 can utilize the power-generation-capable raw materials to generate electrical power that can then be transmitted across electrical transmission lines 122 to the consumers 411. Alternatively, the power obtained from the raw materials in the location 401 can be transported to the power consumers 411 at the location 402 by being "packaged" as steam. Thus, a steam plant 413 can utilize the power-generation-capable raw materials to generate steam that can be transmitted through steam tunnels and pipes 422 to the consumers 411.

"Power" simply refers to the "energy to perform useful work". As such, and as illustrated in the system 400 of FIG. 4, power can be packaged into many different forms, so long as those forms enable the performance of useful work. One example of "useful work" that power can perform can be to generate heat for the power consumers 411 on a cold day. If power sourced from the power-generation-capable raw materials was packaged as electrical power and transmitted through the electrical transmission lines 122, then that power could be utilized to generate heat by connecting an electric heater and passing the electrical power through the electric heater. Conversely, if that power was packaged as steam power and transmitted through the steam tunnels and pipes 422, then that power could be utilized to generate heat by connecting a steam radiator and passing the steam power through the steam radiator. While a greater breadth and depth of appliances exist for performing useful work with electrical power than with steam power, power packaged as steam is no less "power" than power packaged as electricity, since both comprise the ability to perform useful work for the power consumers 411.

Power can also be transported by performing useful work at the location where power from the raw materials can be conveniently generated, and then transporting the generated work products to the power consumers 411. For example, a chemical battery plant 433 can be located near the raw materials in the location 401 and can utilize the power generated from the raw materials to perform useful work in the form of powering a chemical reaction that requires power as input and generates, as output, chemicals that can subsequently be recombined to release power. As will be recognized by those skilled in the art, such chemicals are typically the basis for modern chemical batteries. Thus, the chemical battery plant 433 can utilize the power generated from the raw materials to perform useful work, whose work products are chemical batteries. These chemical batteries can then be transported via chemical battery transportation 442, such as by truck or train transport, to the power consumers 411. The power consumers 411 can then utilize the batteries, thereby using the work that was performed by the power generated from the power-generation-capable raw materials, and can, in such a manner, derive benefits from power sourced from the power-generation-capable raw materials despite the distance between the raw materials location 401 and the location 402 of the power consumers 411.

In a similar manner, a data plant 201 can utilize the power-generation-capable raw materials to perform useful work, namely the processing of data to generate what has been referred to herein as "processed data". In particular, the term "processed data", as utilized herein, means data that has already been processed by the data plant. The term "processed data" is used to distinguish data being output from the data plant from other types of data, such as data being input to the data plant or the concept of data in the abstract. As indicated previously, the processing of data can be performed by the consumers of such processed data, such as individuals or corporations, or it can be performed remotely from such consumers, such as, for example, by an independently-managed data center, such as the data center 130, that was shown in FIG. 1. Thus, the power consumers 411 can include individuals, corporations, and the like, who will consume power in order to process data, and then subsequently consume the processed data, and the power consumers 411 can also include independently-managed data centers that will consumer power in order to process data for data consumers 412 that may be located in a different location 403 than the location 402 of the power consumers 411, though still remote from the location 401 of the power-generation-capable raw materials. In such an instance, rather than delivering power to power consumers 411, such as a data center, in order for that data center to then provide processed data to data consumers 412, the data plant 201 can provide the processed data directly to the data consumers 412, thereby effecting a form of power transfer.

The useful work performed by the data plant 201, namely the processed data generated by such a data plant, can be transported to the data consumers 412, such as via the optical fiber 450. While the work performed by the power sourced from the power-generation-capable raw materials differs, with the chemical battery plant 433 performing work in the form of a chemical reaction and the data plant 201 performing work in the form of the processing of data, in both cases, useful work was performed by power obtained from the raw materials, which no longer needs to be performed by the consumers of such work. The data plant 201 has, therefore, like the chemical battery plant 433, transferred power. From one viewpoint, the processed data generated by the data plant 201 can, thus, be thought of as having a higher "power content" than data that has not yet been processed, since the processed data that is generated by the data plant can be consumed by the data consumers 412, while data that has not yet been processed can only be consumed by those data consumers 412 after they consume power to process that data. The data consumers 412, therefore, derive the benefits of power-consuming work, in the form of the data processing performed by the data plant 201, without consuming power directly themselves to perform such work. In such a manner, the data consumers 412 utilize the power sourced from the power-generation-capable raw materials even though such raw materials are at a location 401 that is remote from the location 403 where the data consumers 412 are located. Again, therefore, as indicated, the data plant 201 effects a form of power transfer from the power-generation-capable raw materials at the location 401 to the data consumers 412 in the location 403 that is remote from the location 401.

However, as illustrated by the system 400 of FIG. 4, the optical fiber 450 through which processed data can be transmitted from a data plant 201 can be many orders of magnitude less expensive than other mechanisms of transferring power including, for example, electrical transmission lines 122, steam tunnels and pipes 442, battery transportation 442, and other like power transportation mechanisms. Consequently, the data plant 201 can enable data consumers 412 to benefit from the power generation capabilities of raw materials that are located in locations, such as the location 401, that would otherwise be too remote and from which it would not otherwise be economically feasible to derive power for those consumers. In other words, given the power available from the raw materials at the location 401, neither the electrical transmission lines 122, steam tunnels and pipes 422, nor transportation 442 could package that power and deliver it to a remote location, such as the locations 402 and 403 in an economical and feasible manner. Only the data plant 201 could make use of the raw materials at the location 401 for the benefit of the data consumers 412 at the location 403 in an economically feasible manner. As such, the data plant 201 can make use of power-generation-capable raw materials that would, otherwise, not be utilized, or would otherwise be wasted.

In many instances, power-generation-capable raw materials are available at a reduced cost, free, or even negative cost precisely because they are so far away from power consumers 411 that there exists no financially viable means by which power generated from those raw materials can be delivered to the power consumers 411 and, as such, the power-generation-capable raw materials are, in essence, worthless. A data plant, such as the data plant 201, positioned near such power-generation-capable raw materials could produce processed data, and can sell its ability to process data, to data processing consumers while simultaneously being powered for free or, at the very least, for a substantially reduced cost.

In one embodiment, a data plant, such as the data plant 201, can transform waste products into processed data, thereby acting as a waste product amelioration service. For example, the drilling for, and pumping of, oil and liquid natural gas often generates waste gas as byproduct that cannot be meaningfully utilized because it is too far away from power consumers 411, but, nevertheless, must still be dealt with for safety and environmental reasons at least. Consequently, in many instances, this waste gas is simply burned off, releasing power that performs no useful work. Not burning the waste gas could cause even worse problems, such as greater environmental difficulties, and conflict with laws preventing the release of natural gas into the atmosphere. An operator of a data plant, such as the data plant 201, could sell a service to such oil and liquid natural gas extraction entities, whereby the operator of the data plant agreed to treat the waste gas being generated by the oil and liquid natural gas extraction entities. The manner in which such waste gas would be treated could be in accordance with, for example, the fuel cell described in detail above. Thus a data plant, such the data plant 201, could convert waste gas into environmentally friendly byproducts such as water and carbon dioxide, and also into processed data, for which data consumers would also be willing to compensate the operator of the data plant. In such an embodiment, the operator of the data plant can receive payments from both the oil and liquid natural gas extraction entities, namely in return for the treatment of the waste gas, and from data consumers as well, namely in return for performing data processing. Other examples of waste products or byproducts that are power-generation-capable raw materials that could be obtained for a reduced cost, or for free, or even for which payment could be received, include fugitive gas, refinery off-gas, petrochemical off-gas, coke oven gas and blast furnace gas, coal bed methane, landfill gas and biogas. Recent estimates suggest that over 100 billion cubic meters of natural gas are simply flared or vented off each year. Data plants powered by such otherwise wasted power-generation-capable raw materials could provide data processing orders of magnitude greater than that provided today, and such data processing could be provided without any additional energy expenditures, since these power-generation-capable raw materials were being "wasted" anyway. Such data processing could also be provided without any additional burden on existing power transmission mechanisms, including electrical power grids, oil pipelines, and the like.

Figure 5:
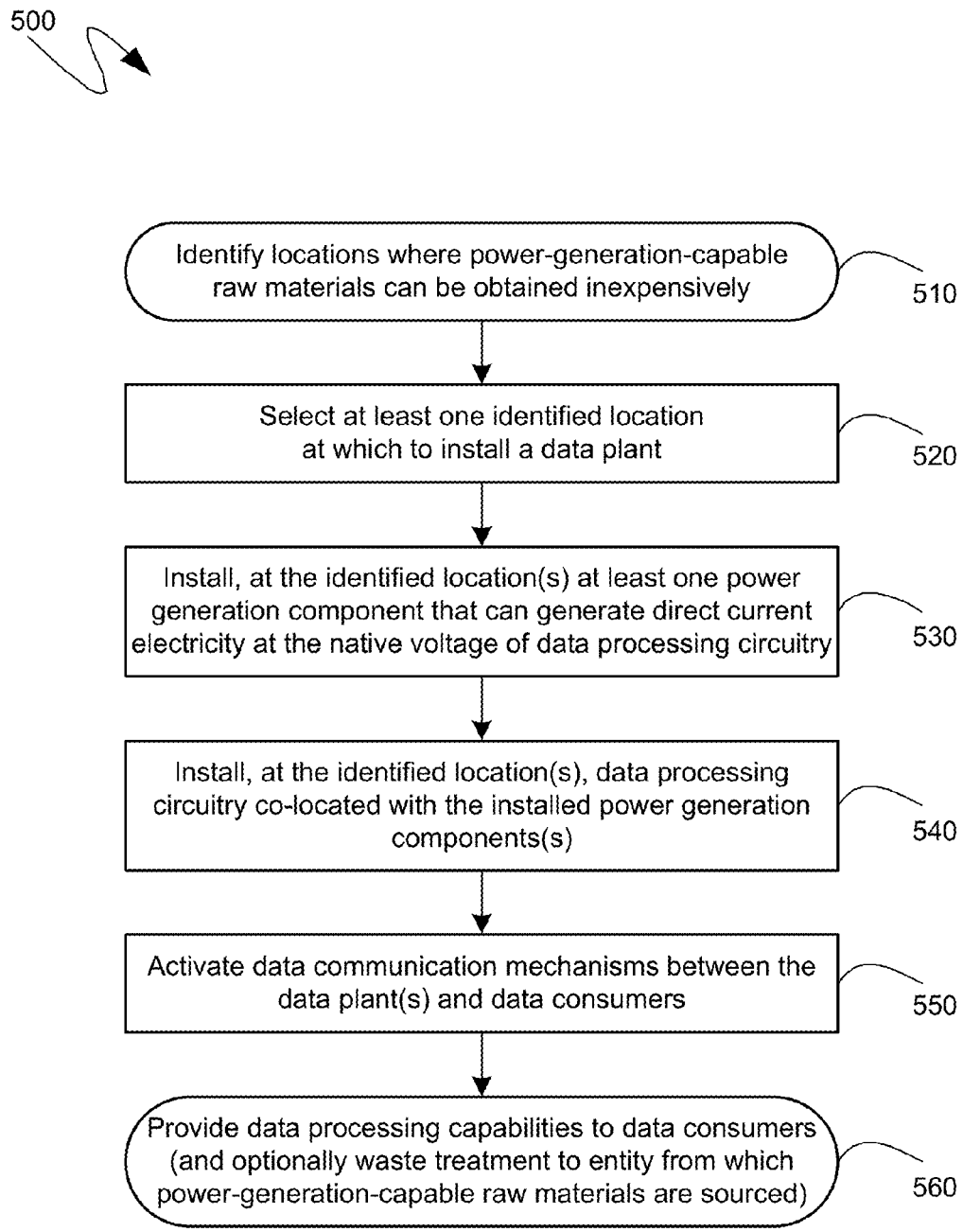
FIG. 5 is a flow diagram of an exemplary method of installing and utilizing a data plant.

Turning to FIG. 5, the flow diagram 500 shown therein illustrates an exemplary series of steps by which a data plant can be installed to perform data processing while simultaneously being powered by power-generation-capable raw materials that can be obtained inexpensively, for free, or even for which the data plant operator can receive compensation for processing them. Initially, at step 510, an identification can be made of locations where power-generation-capable raw materials can be obtained inexpensively, for free, or where power-generation-capable raw materials are waste products or byproducts of another process, performed by another entity, where that other entity can be charged for the processing of those power-generation-capable raw material waste products or byproducts.

At step 520, at least one of the locations identified at step 510, can be selected as a location at which a data plant is to be installed. In one embodiment, the selection, at step 520, can be based on financial factors including, for example, the cost of the power-generation-capable raw materials at the location, the quantity and ease of access of the power-generation-capable raw materials at the location, the distance between the location and existing data communication mechanisms, such as existing fiber-optic cabling, the cost of communicationally coupling one or more data plants at that location to the existing communicational mechanisms and infrastructure, and other like financial factors. In another embodiment, the selection, at step 520, can also be based on, or can alternatively be based on, environmental factors including, for example, the environmental effects of the power-generation-capable raw materials as currently present in the location, the environmental effects of their utilization by the data plant, and environmental effects on the data processing circuitry of the data plant such as, for example, whether the identified locations is in a hot or cold climate.

At steps 530 and 540 a data plant can be installed at the one or more locations identified at step 520. More specifically, at step 530, at least one power generation component can be installed that can generate, from the power-generation-capable raw materials, direct current electricity at the native voltage of at least some of the data processing circuitry. At step 540, data processing circuitry can be installed co-located with the power generation component that was installed at step 530. As indicated previously, the data processing circuitry installed at step 540 can include central processing units, but can also include peripheral data processing circuitry, network data communication circuitry, data storage circuitry, and other like circuitry.

At step 550, data communication mechanisms can be activated between the one or more data plants installed the one or more locations identified at step 520 and data consumers. In one embodiment, the activation of such data communication mechanisms can include the installation of fiber-optic cabling, or the like, to link the data plant to existing fiber-optic cabling or other existing data communication mechanisms. In another embodiment, the activation of such data communication mechanisms can include the establishing of wireless data communication mechanisms including, for example, satellite-based data communication mechanisms. Lastly, at step 560, the installed data plant can provide data processing capabilities to data consumers and, optionally, can provide waste treatment capabilities to the entity from which the power-generation-capable raw materials are being obtained. For example, as indicated previously, oil and natural gas extraction entities can generate natural gas as, essentially, waste that they must manage and dispose of. One or more data plants can provide mechanisms by which such waste gas is processed, and for which service such entities would be willing to compensate the operator of the data plant. Such compensation could be in addition to compensation received by the operator of the data plant from the consumers utilizing the data plant to perform data processing.

As can be seen from the above description, a data plant been presented. In view of the many possible variations of the subject matter described herein, we claim as our invention all such embodiments as may come within the scope of the following claims and equivalents thereto.

We claim:

1. A data plant comprising:
   data processing circuitry etched onto a silicon wafer;
   at least one solar cell comprising the silicon wafer, the at least one solar cell generating direct current electrical power at a native voltage of at least some of the data processing circuitry;
   one or more electrical pathways etched onto the silicon wafer, the electrical pathways electrically connecting the at least one solar cell to the data processing circuitry; and
   a wireless data communication circuitry communicationally coupled to the data processing circuitry and also etched into the silicon wafer;
   wherein the wireless data communication circuitry is wirelessly communicationally coupled to a second data plant, the second data plant comprising:
      a second data processing circuitry etched onto a second silicon wafer;
      a second solar cell comprising the second silicon wafer, the second solar cell generating direct current electrical power at a native voltage of at least some of the second data processing circuitry;
      a second set of electrical pathways etched onto the second silicon wafer, the second set of electrical pathways electrically connecting the second solar cell to the second data processing circuitry; and
      a second wireless data communication circuitry communicationally coupled to the second data processing circuitry and also etched into the second silicon wafer.

2. The data plant of claim 1, wherein the wireless data communication circuitry is also etched onto the silicon wafer.

3. The data plant of claim 2, wherein the at least one solar cell generates direct current electrical power at a native voltage of at least some of the wireless data communication circuitry.

4. The data plant of claim 3, wherein the native voltage of the at least some of the wireless data communication circuitry is 48 VDC.

5. The data plant of claim 1, wherein the native voltage of the at least some of the data processing circuitry is 380 VDC.

6. The data plant of claim 1, wherein the data plant is in a form of a roofing tile.

7. The data plant of claim 1, further comprising a cooling component electrically connected to the at least one solar cell.

8. The data plant of claim 1, wherein the at least one solar cell further comprises a power converter to generate the direct current electrical power at the native voltage of the at least some of the data processing circuitry.

9. A standalone data processing system comprising:
   a first data plant comprising:
      a first data processing circuitry etched onto a first silicon wafer;
      a first one solar cell comprising the silicon wafer, the first solar cell generating direct current electrical power at a native voltage of at least some of the first data processing circuitry;
      a first set of electrical pathways etched onto the silicon wafer, the first set of electrical pathways electrically connecting the first solar cell to the first data processing circuitry; and
      a first wireless data communication circuitry communicationally coupled to the first data processing circuitry and also etched onto the silicon wafer; and
   a second data plant, physically separate and physically decoupled from the first data plant, the second data plant comprising:
      a second data processing circuitry etched onto a second silicon wafer;
      a second one solar cell comprising the silicon wafer, the second solar cell generating direct current electrical power at a native voltage of at least some of the second data processing circuitry;
      a second set of electrical pathways etched onto the silicon wafer, the second set of electrical pathways electrically connecting the second solar cell to the second data processing circuitry; and
      a second wireless data communication circuitry communicationally coupled to the second data processing circuitry and also etched onto the silicon wafer;
   wherein the first wireless data communication circuitry and the second wireless data communication circuitry are wirelessly communicationally coupled.

10. The standalone data processing system of claim 9, wherein the second data plant provides processing redundancy for the first data plant through the wireless communicational coupling between the first wireless data communication circuitry and the second wireless data communication circuitry.

11. The standalone data processing system of claim 9, wherein the first solar cell generates direct current electrical power at a native voltage of at least some of the first wireless data communication circuitry.

12. The standalone data processing system of claim 11, wherein the native voltage of the at least some of the first wireless data communication circuitry is 48 VDC.

13. The standalone data processing system of claim 9, wherein the native voltage of the at least some of the first data processing circuitry is 380 VDC.

14. The standalone data processing system of claim 9, wherein the first data plant and the second data plant are both in a form of a roofing tile.

15. The standalone data processing system of claim 9, further comprising a cooling component electrically connected to the first solar cell.

16. The standalone data processing system of claim 9, wherein the first and second solar cells each further comprise a power converter to generate the direct current electrical power at the native voltage of the at least some of the first and second data processing circuitry.

17. A roof comprising:
   roofing tiles; and
   a first silicon data plant roofing tile comprising:
      a first data processing circuitry etched onto a first silicon wafer;
      a first one solar cell comprising the silicon wafer, the first solar cell generating direct current electrical power at a native voltage of at least some of the first data processing circuitry;
      a first set of electrical pathways etched onto the silicon wafer, the first set of electrical pathways electrically connecting the first solar cell to the first data processing circuitry; and
      a first wireless data communication circuitry communicationally coupled to the first data processing circuitry and also etched onto the silicon wafer; and a second silicon data plant roofing tile, physically separate and physically decoupled from the first silicon data plant roofing tile, the second data plant roofing tile comprising:
a second data processing circuitry etched onto a second silicon wafer;
a second one solar cell comprising the silicon wafer, the second solar cell generating direct current electrical power at a native voltage of at least some of the second data processing circuitry;
a second set of electrical pathways etched onto the silicon wafer, the second set of electrical pathways electrically connecting the second solar cell to the second data processing circuitry; and
a second wireless data communication circuitry communicationally coupled to the second data processing circuitry and also etched onto the silicon wafer;
wherein the first wireless data communication circuitry and the second wireless data communication circuitry are wirelessly communicationally coupled.

18. The roof of claim 17, wherein the first silicon data plant roofing tile provides processing redundancy for the second silicon data plant roofing tile through the wireless communicational coupling established among the first wireless data communication circuitry and the second wireless data communication circuitry.

19. The roof of claim 17, wherein the first solar cell generates direct current electrical power at a native voltage of at least some of the first wireless data communication circuitry.

20. The roof of claim 17, wherein the first silicon data plant roofing tile further comprises a cooling component electrically connected to the first solar cell.

* * * * *